May 20, 1947.    C. S. HUTSELL    2,420,708
BEER METER
Original Filed Dec. 3, 1940    4 Sheets-Sheet 1
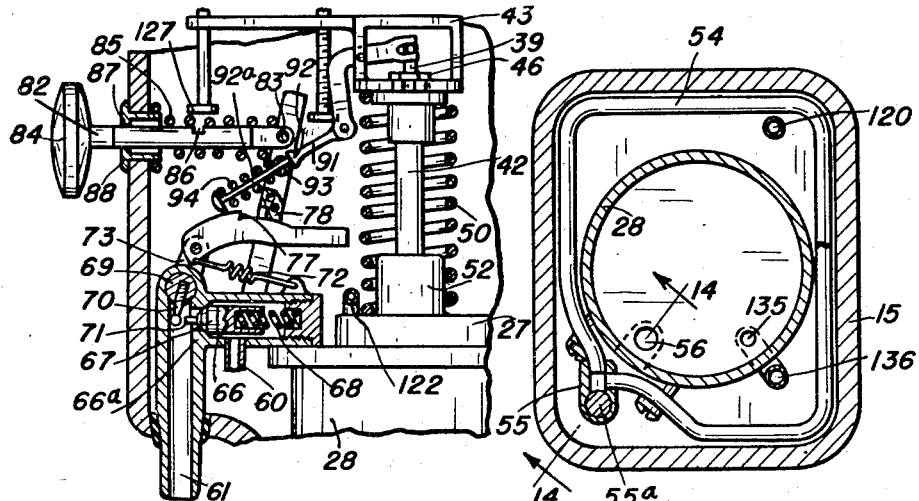
FIG_3    FIG_2
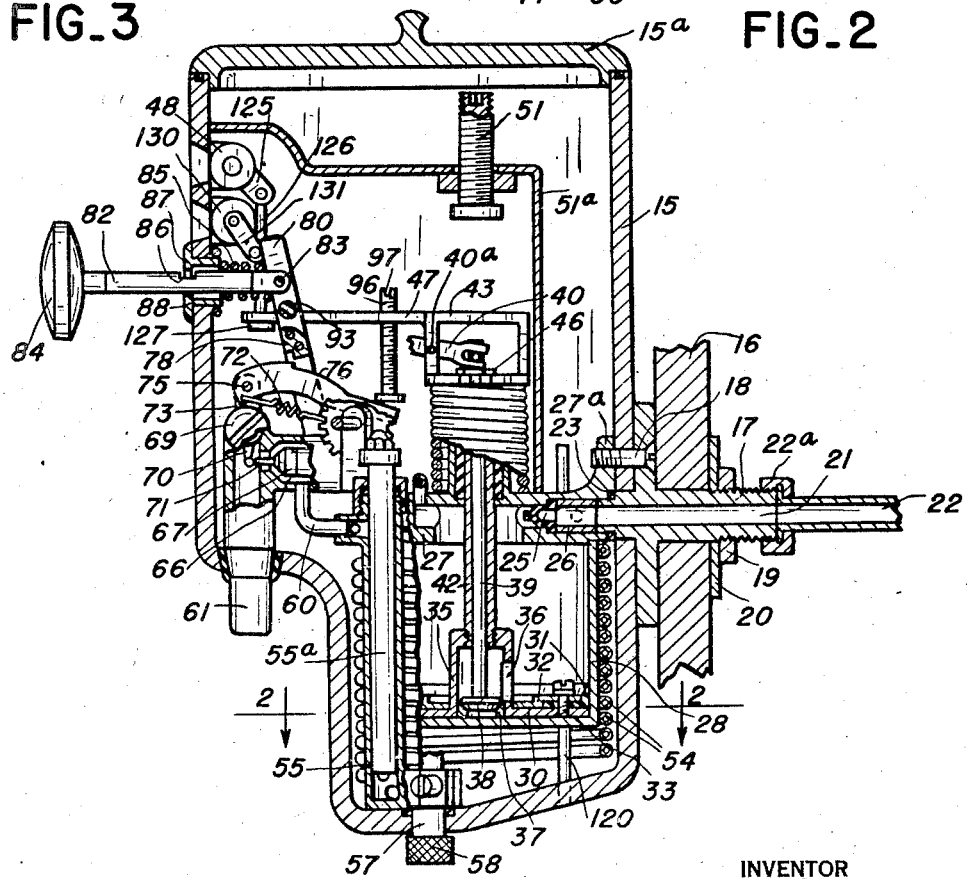
FIG_1
INVENTOR
CLIFFORD S. HUTSELL
BY
*Smith & Trick*
ATTORNEY

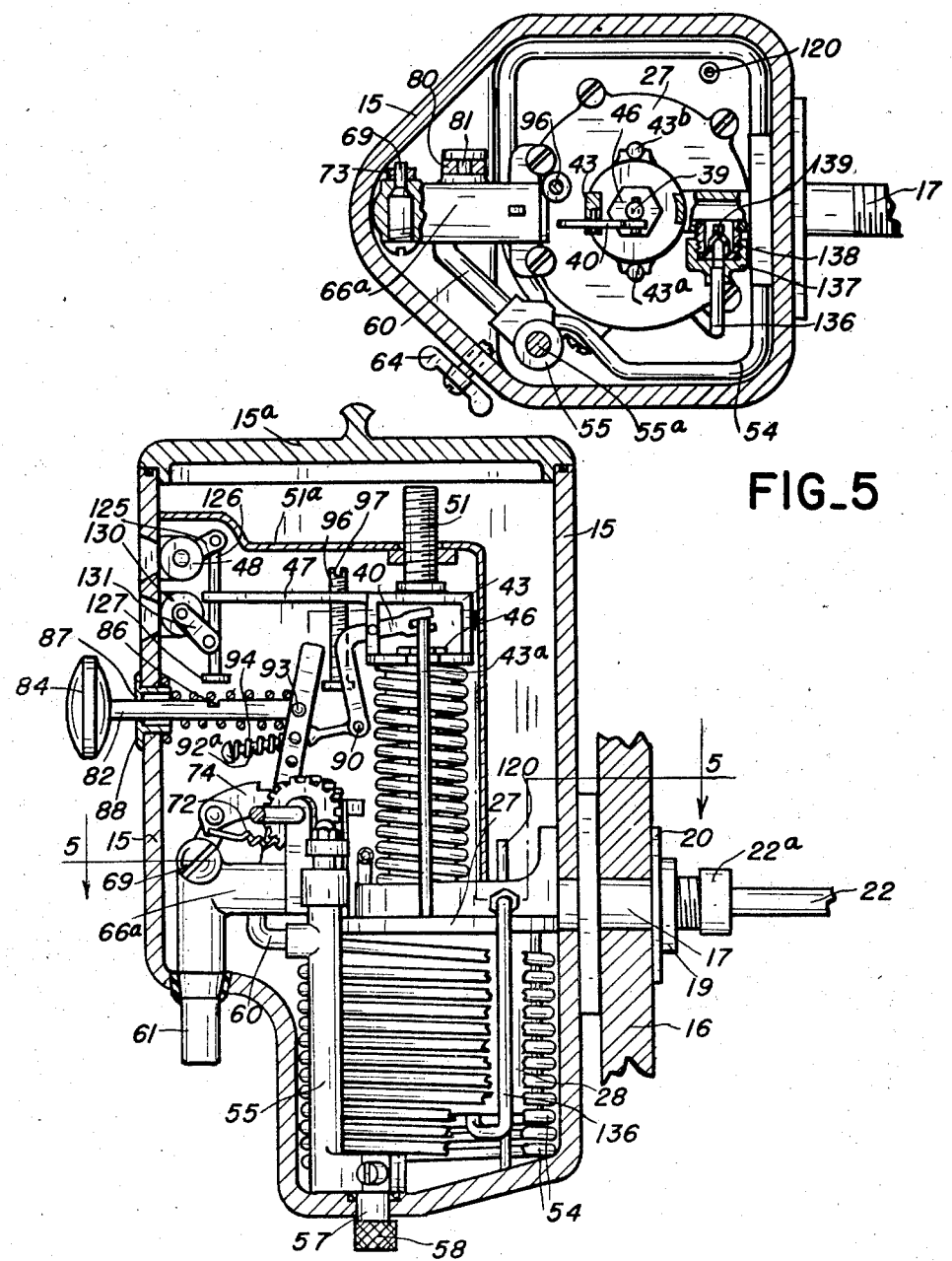

May 20, 1947.  C. S. HUTSELL  2,420,708
BEER METER
Original Filed Dec. 3, 1940  4 Sheets-Sheet 3

INVENTOR
CLIFFORD S. HUTSELL
BY
ATTORNEY

May 20, 1947.　　　　C. S. HUTSELL　　　　2,420,708
BEER METER
Original Filed Dec. 3, 1940　　4 Sheets-Sheet 4
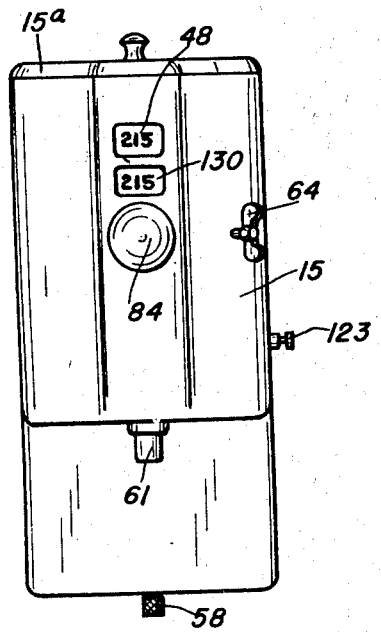
FIG_9
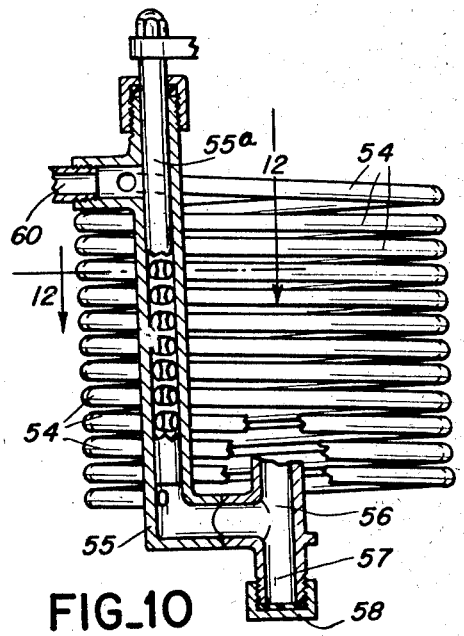
FIG_10
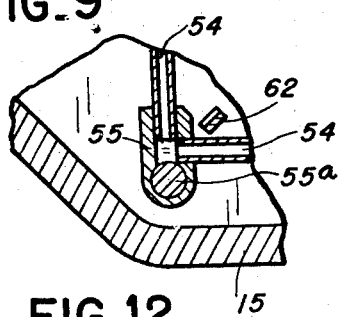
FIG_12
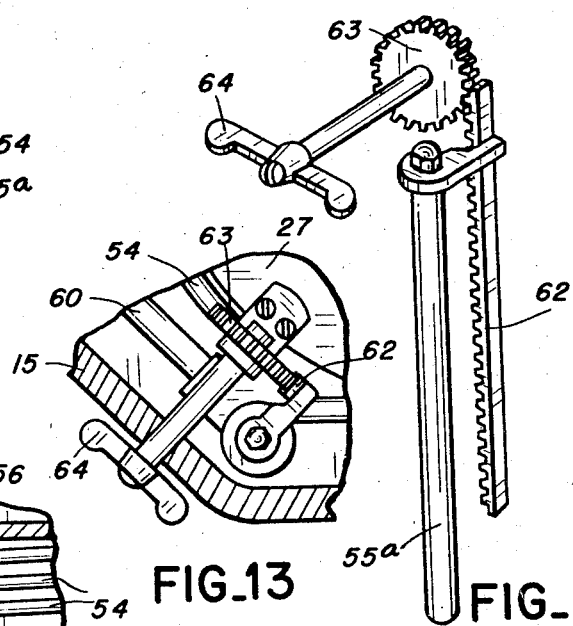
FIG_13　　FIG_11
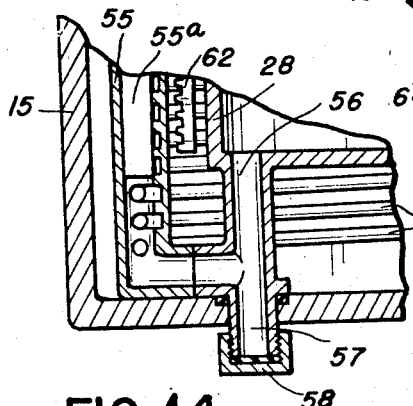
FIG_14
INVENTOR
CLIFFORD S. HUTSELL
BY
ATTORNEY Patented May 20, 1947

2,420,708

UNITED STATES PATENT OFFICE 2,420,708

BEER METER

Clifford S. Hutsell, Seattle, Wash.

Continuation of application Serial No. 368,311, December 3, 1940. This application February 9, 1944, Serial No. 521,691

5 Claims. (Cl. 225—10)

My present invention, a continuation of Serial No. 368,311, filed December 3, 1940, relates to the art of liquid metering and dispensing devices and more particularly to a beer meter.

My invention more specifically is arranged to properly measure and dispense effervescent beverages of which beer is probably the most commonly distributed.

To achieve this general result I provide a metering cylinder and reciprocally disposed piston therein arranged to provide for the accurate measurement of gas-charged liquids.

To carry out the principles of my invention, the liquid is passed through a cooling coil which is immersed in some suitable cooling medium, the length of such coil can be varied so that the beer or other liquid can be passed through one loop or many loops of the coil; in this way the beer is brought under constriction in which its velocity is dissipated by frictional losses without the liquid itself being agitated. The liquid is then led through a discharge opening from which it may be drawn into a glass or other receptacle. This whole dispensing action is controlled, except for the adjustment of the length of coil used, by a single operating lever. My device will control the delivery of beer so that its included gas will be properly handled. The volume of the liquid is accurately measured. Each portion dispensed is accurately counted. The control and serving of beer on draught has always presented a difficult problem due to the beer's susceptibility to the influence of three ever-present, variable factors; pressure, temperature, and agitation or turbulence. Beer in its making is charged with carbon dioxide, the retention of such charge is essential to maintain its quality. When the beer is quiescent, at a sufficiently low temperature, the carbon dioxide is inert. This temperature is below the desirable serving temperatures and as the temperature is raised for serving there is a tendency to discharge the carbon dioxide from the beer. To offset this tendency to dissipate its included gas and also to raise the beer to the discharge faucet, gas or air pressure is applied to the beer in the keg. The amount of pressure necessary to hold the carbon dioxide charge in the beer is in direct proportion to the temperature. At a desirable serving temperature this pressure is usually considerably greater than is required to force the beer up to the faucet. Thus an excess pressure is present that tends to increase the velocity of flow through the cooling system causing agitation and turbulence which liberates the carbon dioxide. This action, to a considerable degree, destroys the essential quality of the beer and in addition frequently causes excessive foaming at the faucet and a consequent wastage of beer.

A certain degree of refrigeration together with some form of constriction between the beer keg and the discharge tap would effect adequate control of the beer if the composition and condition of the beer were constant. However, no constant amount of restriction of the line is equally effective at all times because the beer may vary in its gaseous content, in its temperature, or it may have been recently agitated.

I have found that a very effective method for reducing turbulence is to employ a sufficient length of cooling coil having a cross-sectional area sufficiently small to form a restriction to the flow of beer between the keg and the drawing tap. The variation in the condition of the beer in the keg as it is being used up and between successive kegs makes it necessary to adjust both the refrigeration and the restriction in the line between the keg and the discharge tap or faucet. It has been found that a condition which requires greater restriction also requires more refrigeration—and vice versa. It is for this reason that I have provided my beer meter with a cooling coil, subject to refrigeration, which is arranged so that the beer can be caused to circulate through as much of a coil as is required to give the degree of refrigeration and restriction which will serve the particular beer in question. This control arrangement I provide with a simple adjustment which is led to the outside of the device where it may be manually controlled from time to time as conditions may undergo very appreciable changes.

The principal object of my present invention therefore is to provide a beer meter which will accurately measure the beer, control its effervescence and dispense it.

A further object of my invention is to provide a passage having a variable length so that the temperature of beer may be controlled and by passing it through said passage its pressure can be controlled.

Still another object of my invention is to provide a beer meter that, with the operation of a single handle, will discharge a glass of beer, or other gas-charged liquid, with a predetermined and accurate volume and then by limiting the action of the gaseous content of the beer provide the desired head of foam or collar on each glass dispensed.

Another important object of my present invention is to provide a beer meter which makes unnecessary the employment of a skilled bartender.

A further object of my invention is to provide means whereby an exact volume of beer may be dispensed without attention on the part of the operator after he has moved the operating handle from its inoperative to its operative position so that the bartender may tend several such devices without any fear of overrun, wasting of the beer, or general untidiness.

Still another object of my invention is to provide a device for dispensing beer that is so designed that individual servings, of a predetermined amount having the proper amount of foam or collar, may be drawn and a record made on suitable counters.

A still further object of this invention relates to the provision in a beer meter of a cooling passage means, adapted to receive and convey the beer and to be readily variable as to length to adopt the device for varying conditions that may be encountered in dispensing liquids having varying characteristics.

Other and more specific objects will be apparent from the accompanying drawings, wherein Figure 1 is a vertical sectional view taken through my beer meter showing my operating handle in its outer position, which position is employed during the dispensing operation.

Figure 2 is a horizontal cross-sectional view taken along the line 2—2 of Figure 1.

Figure 3 is a fragmentary view showing certain of the parts of Figure 1 in the position they assume when the operating handle is retracted inwardly to the inoperative position.

Figure 4 is a vertical sectional view similar to Figure 1, except that the entire mechanism is shown in its inoperative position.

Figure 5 is a horizontal cross-sectional view taken substantially along the line 5—5 of Figure 4.

Figure 9 is a front elevational view of my beer meter.

Figure 10 is a view in elevation illustrating the cooling coil and the means employed to selectively vary the length of passage of a coil with certain of the parts associated therewith shown in section.

Figure 11 is a perspective view illustrating the means employed to adjust the passage controlling system.

Figure 12 is a fragmentary, horizontal, sectional view taken along the line 12—12 of Figure 10.

Figure 13 is a fragmentary horizontal, sectional view illustrating the relative position of the parts shown in Figure 11 with respect to their enclosing housing.

Figure 14 is a fragmentary vertical sectional view taken along the line 14—14 of Figure 2.

Referring to the drawings, throughout which like reference characters indicate like parts.

Figures 7, 8:
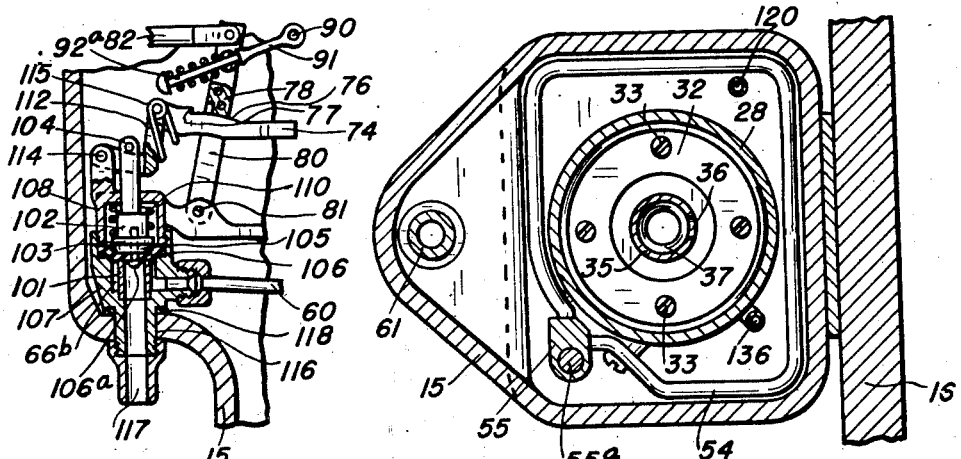
Figure 7 is a horizontal cross-sectional view taken along the line 7—7 of Figure 6.
Figure 8 is a fragmentary view showing a modified construction of certain parts illustrated in Figures 1 and 4, the parts being shown in section, and with certain parts obstructing a clear view in the other figures being omitted for clarity of illustration.

The numeral 15 designates the main housing of my beer meter. This housing may be made of any suitable material providing it has the required strength and can be made liquid-tight in its lower portion so that certain parts of my meter may be provided with refrigeration. A common refrigerating practice in such cases is to pack a coil or passage in ice or in a water bath through which coil fluid may be passed from a supply source. In certain other installations it may be possible to entirely enclose my device in a refrigerating chamber. While in some of the newer types of cabinets I may be able to entirely enclose my beer meter, I have shown it throughout the accompanying drawings as being intended for installation on the outside of a cabinet whose outer wall is indicated by the numeral 16.

A mounting member or stem 17 is provided which is fixedly secured to the housing 15 by a plurality of bolts 18. Stem 17 is held in secure engagement with wall 16 of the beer cabinet, or other fixture, by means of a lock nut 19 seated preferably on a washer 20 of increased size. Through member 17 passes a central bore 21 which is adapted to be suitably connected to the beer supply line 22 by coupling 22a. Packing is inserted at 23 to form a liquid-tight joint at this point and a check valve member 25 is provided at the end of the line. This valve is preferably of the self-closing type, usually made of rubber, and known to the trade as a Thomas valve. A seating tube 26 is provided for the easy placement of this member.

As a convenience in assembling my unit, and to provide maximum security, I have provided a cylinder head 27 which has an upwardly extending lug 27a all of which is formed as part of the metering cylinder 28. This cylinder may be made of any suitable material to which the beer or other fluid is non-corrosive. When the cylinder is made of plastic it should be of such a composition that it will not flavor or taint the beer that, at times, may remain in the unit over considerable periods.

Disposed for vertical reciprocation within cylinder 28 is a piston 30. This piston is provided with a cup-like sealing member 31 which is held in place by a keeper-disc 32 by means of a plurality of screws 33.

Secured to, or formed as part of, piston 30 is an upwardly extending valve housing 35 which is pierced with one or more communicating openings 36. In valve housing 35 I provide a valve seat 37 adapted to cooperate with the valve 38. This valve is provided with a stem 39 which extends upwardly and is engaged by the operating lever 40. Encircling valve stem 39 is a tubular guide member 42 which is secured to valve housing 35 by the threads shown throughout the various views or by any other convenient means. At its upper end, tube 42 is secured within a housing member 43 which fits over and is fixedly secured to tube 42 by set screw 44. I provide the packing gland 45 to seal the tube. The packing of this gland is held under compression by gland nut 46. It can be seen that beer, which is under pressure in housing 35, and which might escape upwardly along stem 39, cannot pass this packing gland 46.

Figure 6:
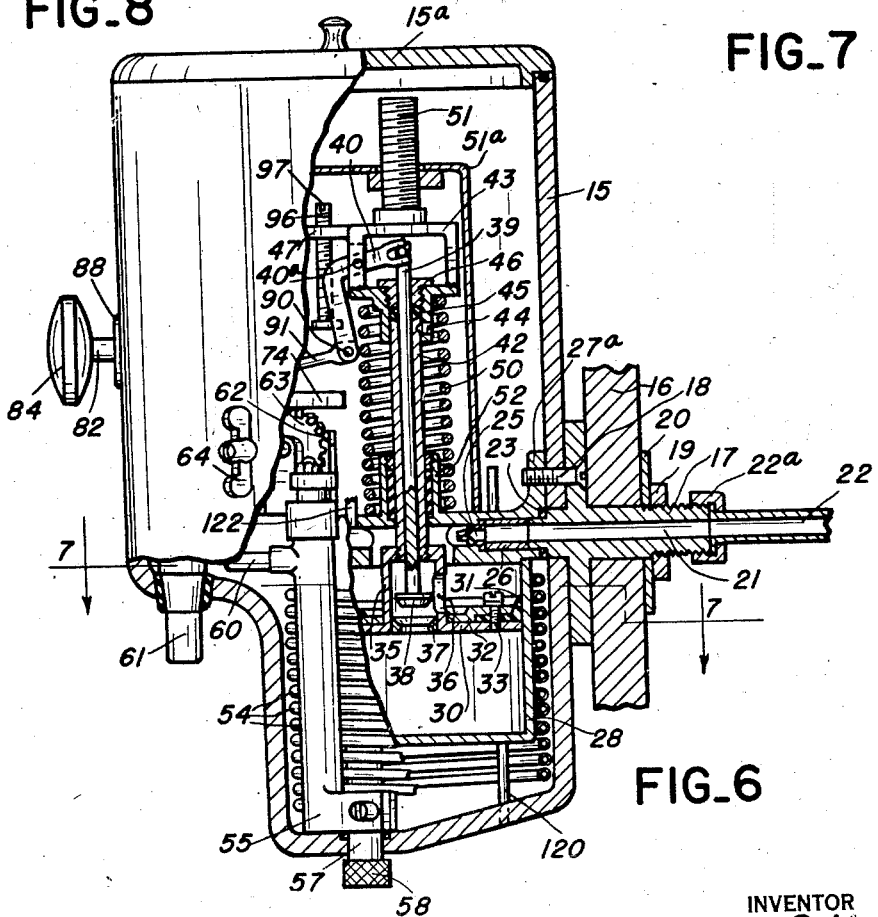
Figure 6 is a vertical side view of my device with certain parts broken away and shown in section to better illustrate the interior construction.

Housing 43 is provided with side notches or other means to engage guide rods 43a and 43b on each side to insure vertical, non-rotatable motion. Housing 43 also has an outwardly extending flange portion 47 adapted to operatively engage the counter 48 which functions to tally the number of servings dispensed by my beer meter. Housing 43 has a still further purpose in that it provides an upper seat for the compression spring 50 that tends at all times to raise the piston. The upward movement of the piston may be adjustably determined by the threaded stop member 51 which is engaged by the surface of housing 43 at the upper limit of its stroke. The greater distance this screw is adjusted downwardly the shorter will be the stroke of the piston and consequently the smaller the serving of fluid. Stop 51 is mounted in the housing 51a as shown in Figures 1, 4, and 6.

On the cylinder head 27 I provide an upwardly extending hollow boss 52 in which is located a suitable packing gland so that liquid will be prevented from passing up along the outside of tube 42.

Disposed around cylinder 28 is the cooling and pressure controlling passage 54. This passage is formed of a plurality of loops of tubing that enclose the cylinder 28 in the manner shown in Figure 2 and these loops are jointed to a header cylinder 55 so that each coil is, in effect, a loop of a spiral after the showing of Figure 12, which may be considered a typical section. The header 55 has two series of inlet openings disposed angularly to each other. Adjacent openings of a series are separated by partitions as shown in Figure 14, which result from the angular opposition of adjacent openings of the two series.

Cylinder 55 is laterally connected to the discharge pipe 56, which in turn connects with the bottom of cylinder 28 as shown in Figure 14. Tube 56 is provided with a downwardly extending sump portion 57 which is capped at 58 to provide a convenient cleanout means for the cylinder.

At its upper end the cylinder 55 may be associated with the discharge pipe 60 which leads through suitable valving mechanism to the discharge spout 61 of my beer meter.

Disposed within cylinder 55 is the piston 55a which is moved longitudinally of cylinder 55 by remotely controlled means best shown in Figure 11. These control means consist of rack gear 62 offset from piston 55a and adapted to operatively engage a pinion gear 63 which gear, in turn, is under manual control, from exterior of my beer meter housing by means of a wing knob 64. By rotating the pinion 63 to raise or lower the rack 62 the position of piston 55a with respect to the various openings between cylinder 55 and the individual loops 54 of the cooling passage can be accurately adjusted. In this way, as beer is forced by piston 30 out through passageway 56 into the cylinder 55, it can be made to circulate around any number of loops 54, as the operator may elect. It follows that when the piston is at its uppermost position, the beer can flow from pipe 56 up through cylinder 55 and out tube 60 without passing through any of these loops.

As the beer leaves the coil formed of a plurality of loops 54 through tube 60, it passes into a valve chamber 66 or in the modified structure of Figure 8, into valve chamber 66b. This valve chamber is provided with a valve 67 which normally is seated through urgence of the expansion spring 68. When this valve is closed there can be no flow of beer past this point.

To operate valve 67 I provide a rockable shaft 69 having a downwardly extending pin or detent 70 adapted to engage an outwardly directed projection 71 of valve 67. Shaft 69 is normally rocked, by spring 72 operating on lever 73, to the position shown in Figure 3 at which time the valve 67 may close.

To open the valve requires outward movement being applied to lever 73. This movement may be conveniently achieved by moving the hinged lever 74 which is pivotally secured at 75 to lever 73. Lever 74 is provided on its upper surface with an arcuate portion 76 terminating in a stop or abutment 77. This abutment is adapted to be operatively engaged by a lug 78 secured to lever 80.

Lever 80 is pivoted at 81 to housing 66a enclosing valve 67 or other suitable support and is under control of the hand operated rod 82 which is pivotally connected to the lever at 83. At its outer end rod 82 is provided with an operating knob 84. Rod 82 normally is urged inwardly by the expansible spring 85. It may be held in its outer position, however, by notch 86 being engaged over lip 87 of bushing 88, which in turn is secured to housing 15. It will be readily understood, it is believed, that as handle 84 is pulled outwardly, lever 80 will be moved to the left as viewed in Figure 3 rocking shaft 69 and thereby opening valve 67 so that beer or other fluid can flow past the valve and out the discharge opening 61. In this movement lug 78 abuts stop 77 to move lever 74 which in turn moves lever 73 to rock shaft 69.

Lever 80 has a second purpose—namely, that of providing an operating means for the valve 38. Valve 38 is under the control of the bell crank lever 40 which has a bifurcated end adapted to engage a pin or other means on the end of valve stem 39. Lever 40 is pivoted at 40a to housing 43. At its lower end the bell crank lever 40 is provided with a pivot connection 90 which operatively engages rod 91. This rod is provided with a stop portion at 92 and also a reduced portion 92a which passes through a rockable guide member 93 that is secured to lever 80.

On its outer end rod 91 is provided with a compression spring 94 that encircles the portion 92a and which is held in place by an enlarged head so that stop 92 is normally held in engagement with the rockable guide 93. This arrangement is necessary in order that valve 38 may be raised off its seat or permitted to close under the control of the operator. It also provides convenient connecting means so the valve can be opened without the necessity of having housing 43 in any definite position for such operation.

With this construction in mind, it will be clear that when the rod 82 moves inwardly of the casing, the lever 80 moves about its pivot point carrying the rod 91 with it. That is, the guide 93 presses against the stop 92 on rod 91 to produce a depressing action of one end of the bell-crank member 40 and a lifting action of the other end of the bell-crank to lift the rod 39 and effect opening of valve 38. This operation may be accomplished at the cessation of the flow of the fluid from chamber 28 or at any other time that the operator wishes to permit the return of piston 30 to the upper part of the chamber. Thus, by opening the valve 38, fluid may flow from one side of the piston to the other and the spring will lift the piston to accomplish this result.

Referring to Figure 1, the kick-off mechanism, employed to close valve 67, is indicated. When piston 30 reaches the bottom of its stroke it is desirable that valve 67 be closed. To accomplish this I provide a downwardly extending screw 96 which may be adjusted by inserting a screw driver in kerf 97. When the screw is adjusted properly it will contact the outwardly extending end of lever 74 and press that lever downwardly against the urgence spring 72. This releases the stop 77 from lug 78—thus permitting spring 72 to draw lever 73 to the right as viewed in Figures 1 and 3 thereby releasing the operating member 70 from engagement with the valve 67 and permitting spring 68 to seat the valve. For ready access to the interior of the housing 15 I provide the removable, close fitting cover 15a.

In Figure 8 I have shown a slight modification of the discharge valve arrangement. This valve functions by the same control means illustrated throughout my drawings, the changes shown here being of details involving the valve housing and the exact means for opening and closing the valve in the discharge line to the spout. This construction has certain advantages over my other structure for meeting particular conditions.

In this instance the beer discharge pipe 60 discharges into a valve chamber 66b which is annular in form about a tubing baffle 101. Adapted to seat on the end of tube 101 is the valve member 102. This is arranged as a diaphragm valve with a cylindrical body portion 103 and a stem 104 carrying a valve seat 105. Secured to the face of the seat portion is a flexible, preferably rubber, valve member 106 which is attached to the valve by screw 106a. At its periphery this rubber valve member is secured between the two members making up the valve housing which comprise the lower housing member 107, and the upper housing member 108. The rubber valve disc 106 acts as a diaphragm valve, the rubber being yieldable so that the linkage to operate the valve has some margin of operative exactness and a long wearing seat is thus provided. The valve is normally urged to its closed position by the compression spring 110. The valve is operated by means of a bell crank lever 112 which is pivotally mounted at 114 to housing member 108 and at its opposite end is secured to the pivoted arm 74 which is common with my other structure. A spring 115 is employed to keep pivoted lever 74 in engagement with lug 78.

At its lower end, the lower housing member 107 is seated within a machine bore at 116 in housing 15 and is provided with a discharge tip 117 which serves to hold the mechanism in position and to provide pressure to insure adequate sealing of gasket 118.

During normal operation of my device for cooling beer the housing 15 is charged with a quantity of ice and some water, either supplemental or that produced by melting of the ice. Sufficient water is necessary so that the loops of the cooling passage are at all times immersed in ice water. As the ice in the water melts and the level of the ice water rises, it will reach a depth greater than is necessary to cover the cooling passage. In that event I permit the water to escape from the housing by flowing outwardly through the overflow tubing 120.

In the initial liquid-charging stages of my beer meter, wherein the chamber 28 and the other passages and chambers throughout the mechanism are empty of fluid and full of air I find that supplemental venting means are necessary in order that no air blocks or other air constrictions can remain within the device. In order to vent the mechanism a tube 122 is fitted to the head 27 of the piston chamber, that being approximately the highest point in the system. The tube 122 is led to the needle valve 123 readily accessible for manual manipulation exterior of the housing 15. The valve 123 is opened as the beer initially flows into the device and of course the pressure behind the beer will force the air out of the system and through the valve into the atmosphere. As soon as the device is completely charged with beer the valve 123 will be closed to prevent further leakage.

The counter 48 is of the well known "Veeder" type or other similar mechanism and is operated by means of a lever 125 to which is attached the depending link 126 having the lower head 127 thereon. The link 126 passes through the arm 47 of the housing 43 and on each downward stroke of the piston 30 and consequent downward stroke of the arm 47 the under face of the arm abuts the head 127 drawing the arm 125 downwardly to operate the mechanism of the counter and to register a single function of the piston. An additional counter mechanism 130 is mounted adjacent the counter 48 and it has a lever 131 that is positioned to be moved by the upper end of the lever 80 when the rod 82 and knob 84 are drawn into the outer position best shown in Figure 1. In this way a record on the counter is established of each time that the knob, and the means actuated thereby, is moved.

In the lower face of the chamber 28 I provide the cleanout opening 135 to which I connect the by-pass tube 136 which joins with the coupling 137 best seen in Figure 5. The coupling 137 is threadedly engaged to a nipple 138 and enclosed therein is an auxiliary "Thomas" valve 139 or other similar check valve mechanism. It will be seen that the tube 136 is connected into the supply line back of the check valve 25.

The operation to clean out the mechanism is substantially as follows: a suitable connection is made on the spout 61 for the supply of either cleansing fluid or air and such an element under pressure is fed upwardly through the spout 61. In this instance, of course, the knob 84 and rod 82 will have to be drawn partly outwardly and the notch 86 is engaged on the lip 87, to maintain the valve 67 in open position by the operation of the detent 70 on the valve extension 71.

The cleansing fluid introduced through the spout 61 passes through the valve chamber 66 and around the valve through the tubing 60 and into the loops 54 of the cooling passage. It is preferable during this operation to have the piston 55a retracted its greatest distance in the cylinder 55 so as to make certain the flow of the cleansing fluid throughout each and every loop forming the cooling passage. From the bottom of the chamber 55 the fluid flows laterally and then upwardly into the chamber 28 through the vertical passage 56. The cleansing fluid thus circulates throughout the piston chamber 28 around the piston 30 through the valving mechanism outwardly through the opening 135 and the tube 136 to the back side of the check valve 25 and out through the passage 21 from whence it may be conveyed to a suitable source for disposal.

Method of operation

In order to place my beer meter in operation it is necessary that beer under pressure be supplied through tube 22. And further it is necessary that some form of refrigeration be provided for coil 54. Such refrigeration means has not been illustrated as such is well known. It is desirable, however, that housing 15 be filled with liquid sufficiently deep to fully cover coil 54. This liquid may be cooled by inserting ice through cover 15a or suitable refrigerating coils may be employed to cool the liquid or the entire housing of my device may be placed within a refrigerating cabinet with only the operating handle 84 and the piston control handle 64 being exposed.

As beer enters my device through tube 22 it passes through valve 25, which acts as a check valve, into the chamber above piston 30, the piston normally being in the position shown in Figure 1. Check valve 25 is used only in conjunction with the check valve of Figure 5 in forcing the beer in the machine back into keg during the cleaning operation. The beer thus introduced is under full keg pressure and this pressure holds the piston in its lower position against the upward urge of spring 50 which, generally, is less powerful than the pressure on the beer in the supply line.

When knob 84 is pressed inwardly, spring 85 operates through lever 80, rod 91, and bell crank 40 to lift valve 38 off its seat. When this valve is unseated top pressure on the piston can escape and the spring 50 will raise the piston. The beer can then flow through opening 36, out through the valved port, and into the cylinder below piston 30. As this occurs the piston will travel upwardly due to the urgence of the spring 50 a distance defined by the stop member 51. When the piston has reached its upper adjusted position, housing 43 will abut stop 51 and thereby limit the upward movement of the piston.

There is, at this point, a measured quantity of beer, or other liquid that is being dispensed, under the piston still under full keg pressure so that there has been permitted no liberation of gas from the liquid. This pressure is retained through the fact that valve 67 is closed during the cycle of operation.

The operator, at this point, using his past experience as a criterion, adjusts piston 55a within cylinder 55 by means of the wing knob 64. This determines the number of loops 50 of the cooling coil which the beer will have to pass through before it can be discharged by means of pipe 60. When the operator's adjustment of piston 55a is correct, the beer will pass through enough loops of the coil so that this constriction will counteract any excessive pressure that may be on the keg. Simultaneously the cooling effect of the refrigerant on the loops that are in use will be sufficient to deliver the beer at the desired temperature and pressure so that the included gas, normally carbon dioxide, will in no way be disturbed. It follows that the more loops 54 of coil that are used, the longer will be the period that the beer is subjected to refrigeration and the cooler it will be when finally delivered. In addition, the greater will be the drop in pressure on the beer because the cooling passage formed of the plurality of loops and the header cylinder has a constricting effect in that it is normally of smaller diameter than supply pipe 22.

When the operator wishes to draw a glass of beer he pulls outwardly on knob 84 compressing spring 85 and actuating the bell crank 40. This closes valve 38 and effects operation of the pivoted lever 74 by engagement of lug 78 with stop 77 so as to partially revolve shaft 69. Thus is opened the valve 67. As the measured quantity of beer in the chamber below piston 30 is now only under such pressure as is produced by the resistance of the liquid passing the cooling coil, the keg pressure on the beer passing through valve 25 will force the piston downwardly against spring 50 expelling the measured quantity of beer out through the discharge opening 61.

An operator will soon determine the proper position for piston 55a so that the beer will be delivered into a glass, for instance, with the exact amount of collar or head that he may desire. This head or foam collar is controllable by controlling the conditions that promote foaming of beer. These are the temperature of the beer, the pressure on the beer, and the turbulence created within the beer during handling.

Inasmuch as the cooling coil and valve arrangement do not provide any local or spot constriction of the beer stream, there is no wire drawing or unusual turbulence produced in the beer but rather it acts the same as a straight draught of beer through a tube. Therefore, the factors that really control the foaming in my equipment are the temperature and the pressure on the beer which can be definitely controlled by the positioning of piston 55a. As the housing 43 is directly connected by arm 47 through link 126 to the ratchet lever arm of counter 48, an accurate counting of each serving is accomplished.

In this beer meter, the beer is subjected to a gradual release of pressure as it approaches the discharge spout 61 but there is no sudden release of pressure and beer in the measuring cylinder 28 is at all times under pressure sufficient to retain the included gas.

When the piston 30 is urged downwardly in the chamber 28 by means of the keg pressure being applied to its upper face, the housing 43 and the arm 47 are also carried downwardly. The lower end of the adjustment pin 96 near the bottom of the stroke, strikes the free end of lever 74 in the manner disclosed in Figure 1. This dislodges the abutment 77 from the notch member 78. The action is fairly rapid and permits the movement to the right of the rock lever 73 on the shaft 69, due to the contracting urgence of the spring 72. The action is similar to the release of a trigger mechanism and the spring 72 quickly contracts and rapidly moves the detent 70 out of its operative position against the extension 71 of the valve 67. The timing of this operation is preferably best when it permits the closing of the valve 67 to occur simultaneously with the evacuation of the last portion of the measured quantity of beer from the chamber 28. When the valve can thus snap quickly closed, no following drip is permitted and thus excessive foaming of the beer is prevented. Rod 82 must be released from lip 87 at the end of a dispensing flow of fluid, when it is so engaged by the operator, before the device may be recharged for a subsequent draft of fluid. Engaging rod 82 on lip 87 is optional and usually occurs only during cleansing operation.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

I claim:

1. Dispensing mechanism for effervescent fluids, comprising: a receiving chamber having a valved reciprocal spring pressed piston therein and fluid supply and discharge means associated therewith to supply fluid to said chamber on one side of the said piston against the urgence of its spring and to discharge the fluid from the other side of said piston, valved dispensing means associated with the discharge means, manually operable adjustable link means to close the valve in said piston and to simultaneously open the valve in the dispensing means, and means movable with said piston and operable upon the adjustable link means to effect the closing of the valve in said dispensing means after a predetermined interval of the stroke of said piston, said manually operable means being operable at the cessation of the flow of fluid from said chamber to open the valve in said reciprocal piston to permit the piston to move under the urgence of its spring and to permit fluid to flow from the supply side to the discharge side of said piston.

2. Dispensing mechanism for effervescent fluids, comprising: a receiving chamber having a valved reciprocal piston therein and fluid supply means associated therewith to supply fluid to said chamber on one side of said piston, a discharge passage connected to said chamber on the other side of said piston to receive fluid therefrom, valved dispensing means associated with the discharge end of said discharge passage, manually operable adjustable link means to close the valve in said piston and to simultaneously open the valve in the dispensing means, and means movable with said piston and operable upon the adjustable link means to effect the closing of the valve in said dispensing means after a predetermined interval of the stroke of said piston, said manually operable means being operable at the cessation of the flow of fluid from said chamber to open the valve in said reciprocal piston to permit the flow of fluid to the discharge side of said piston.

3. Dispensing mechanism for effervescent fluids, comprising: a receiving chamber having a valved reciprocal piston therein and fluid supply means associated therewith to supply fluid to said chamber on one side of said piston, a discharge passage connected to said chamber on the other side of said piston to receive fluid therefrom, valved dispensing means associated with the discharged end of said discharge passage, manually operable adjustable link means to close the valve in said piston and to simultaneously open the valve in the dispensing means, and means movable with said piston and operable upon the adjustable link means to effect the closing of the valve in said dispensing means after a predetermined interval of the stroke of said piston.

4. Dispensing mechanism for effervescent fluids, comprising: a receiving chamber connected to a supply line and adapted to receive and measure a quantity of fluid, means for evacuating fluid from said receiving chamber, a discharge passage connected to said chamber and adapted to receive fluid evacuated therefrom, dispensing means associated with the discharge end of said discharge passage having a manually operable valve to permit the flow of fluid from said discharge passage, adjustable link means associated with the fluid evacuating means of said receiving chamber, and stop means operable upon said adjustable link means for closing said valve upon a predetermined evacuation of said receiving chamber.

5. Dispensing mechanism for effervescent fluids, comprising: a receiving chamber connected to a supply line and adapted to receive and measure a quantity of fluid, means for evacuating fluid from said receiving chamber, a discharge passage connected to said chamber and adapted to receive fluid evacuated therefrom, dispensing means associated with the discharge end of said discharge passage, having a manually operable valve to permit the flow of fluid from said discharge passage, adjustable link means associated with said valve, and stop means operable upon said adjustable link means to close said valve upon a predetermined evacuation of said receiving chamber.

CLIFFORD S. HUTSELL.

REFERENCES CITED

The following references are of record in the file of this patent:

UNITED STATES PATENTS

| Number | Name | Date |
|---|---|---|
| 2,143,565 | Minea | Jan. 10, 1939 |
| 1,830,719 | Rollins | Nov. 3, 1931 |
| 1,134,243 | Stricker | Apr. 6, 1915 |
| 1,565,686 | Titus | Dec. 15, 1925 |
| 773,388 | Gerken | Oct. 25, 1904 |
| 1,987,810 | White | Jan. 15, 1935 |
| 747,622 | Mamerow | Dec. 22, 1903 |

FOREIGN PATENTS

| Number | Country | Date |
|---|---|---|
| 36,798 | Austria | Mar. 26, 1909 |